US010713232B2

(12) United States Patent
Hayzen (10) Patent No.: US 10,713,232 B2
(45) Date of Patent: Jul. 14, 2020

(54) EFFICIENT DATA PROCESSING

(71) Applicant: Computational Systems, Inc., Knoxville, TN (US)

(72) Inventor: Anthony J. Hayzen, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 334 days.

(21) Appl. No.: 15/953,815

(22) Filed: Apr. 16, 2018

(65) Prior Publication Data

US 2019/0318023 A1 Oct. 17, 2019

(51) Int. Cl.
*G06F 16/22* (2019.01)
*G06F 7/08* (2006.01)
*G06F 16/13* (2019.01)
*G06F 16/11* (2019.01)
*G06F 16/21* (2019.01)

(52) U.S. Cl.
CPC ............ *G06F 16/2272* (2019.01); *G06F 7/08* (2013.01); *G06F 16/116* (2019.01); *G06F 16/13* (2019.01); *G06F 16/214* (2019.01)

(58) Field of Classification Search
USPC ......................................................... 707/715
See application file for complete search history.

(56) References Cited

U.S. PATENT DOCUMENTS

| | | | | |
|---|---|---|---|---|
| 6,681,218 B1* | 1/2004 | Zou | ........................ | G06F 16/278 707/696 |
| 6,795,868 B1* | 9/2004 | Dingman | ............... | G06F 16/258 709/246 |
| 7,774,321 B2* | 8/2010 | Tomic | .................... | G06F 40/226 707/690 |
| 9,817,877 B2* | 11/2017 | Taranov | ................ | G06F 16/258 |
| 10,146,833 B1* | 12/2018 | Muniswamy Reddy | ..................... | G06F 16/24539 |
| 10,191,663 B1* | 1/2019 | O'Neill | .................... | G06F 3/065 |
| 10,275,489 B1* | 4/2019 | Muniswamy Reddy | ..................... | G06F 16/24552 |
| 2015/0149441 A1* | 5/2015 | Nica | ................. | G06F 16/24542 707/719 |
| 2017/0109421 A1* | 4/2017 | Stearn | .................... | G06F 16/951 |

OTHER PUBLICATIONS

Nystrom et al., "Database pointers: a predictable way of manipulating hot data in hard real-time systems," publication unknown.
Database systems: the complete book, solutions for chapter 13, publication unknown.
Explicit C++ modern C++ programming, for serious programmers, publication unknown.
Reading a memory mapped block of data into a structure, Stack Overflow, publication unknown.

* cited by examiner

*Primary Examiner* — Cam Linh T Nguyen
(74) *Attorney, Agent, or Firm* — Luedeka Neely Group, P.C.; Rick Barnes (57) ABSTRACT

A method for improving the operation of a computer by transferring data from an SQL database in a storage unit to a memory by copying the data from the SQL database to a binary file in the storage unit, where the binary file having a data structure and a data type. A data file having the data structure and the data type is configured within the memory, and the binary file in the storage unit is copied to the data file in the memory with a single read/write operation.

5 Claims, 8 Drawing Sheets

| | X = Var 1 | X = Var 2 | X = Var 3 | X = Var ... | X = Var M |
|---|---|---|---|---|---|
| Y = Var 1 | Unity | $\frac{\sum_i (x_i-\bar{x})(y_i-\bar{y})}{\sqrt{\sum_i (x_i-\bar{x})^2}\sqrt{\sum_i (y_i-\bar{y})^2}}$ | $\frac{\sum_i (x_i-\bar{x})(y_i-\bar{y})}{\sqrt{\sum_i (x_i-\bar{x})^2}\sqrt{\sum_i (y_i-\bar{y})^2}}$ | $\frac{\sum_i (x_i-\bar{x})(y_i-\bar{y})}{\sqrt{\sum_i (x_i-\bar{x})^2}\sqrt{\sum_i (y_i-\bar{y})^2}}$ | $\frac{\sum_i (x_i-\bar{x})(y_i-\bar{y})}{\sqrt{\sum_i (x_i-\bar{x})^2}\sqrt{\sum_i (y_i-\bar{y})^2}}$ |
| Y = Var 2 | Duplicate | Unity | $\frac{\sum_i (x_i-\bar{x})(y_i-\bar{y})}{\sqrt{\sum_i (x_i-\bar{x})^2}\sqrt{\sum_i (y_i-\bar{y})^2}}$ | $\frac{\sum_i (x_i-\bar{x})(y_i-\bar{y})}{\sqrt{\sum_i (x_i-\bar{x})^2}\sqrt{\sum_i (y_i-\bar{y})^2}}$ | $\frac{\sum_i (x_i-\bar{x})(y_i-\bar{y})}{\sqrt{\sum_i (x_i-\bar{x})^2}\sqrt{\sum_i (y_i-\bar{y})^2}}$ |
| Y = Var 3 | Duplicate | Duplicate | Unity | $\frac{\sum_i (x_i-\bar{x})(y_i-\bar{y})}{\sqrt{\sum_i (x_i-\bar{x})^2}\sqrt{\sum_i (y_i-\bar{y})^2}}$ | $\frac{\sum_i (x_i-\bar{x})(y_i-\bar{y})}{\sqrt{\sum_i (x_i-\bar{x})^2}\sqrt{\sum_i (y_i-\bar{y})^2}}$ |
| Y = Var ... | Duplicate | Duplicate | Duplicate | Unity | $\frac{\sum_i (x_i-\bar{x})(y_i-\bar{y})}{\sqrt{\sum_i (x_i-\bar{x})^2}\sqrt{\sum_i (y_i-\bar{y})^2}}$ |
| Y = Var M | Duplicate | Duplicate | Duplicate | Duplicate | Unity |

EFFICIENT DATA PROCESSING

FIELD

This invention relates to the field of data processing. More particularly, this invention relates to improving the operation of a computer by providing more efficient reading and locating of data, particularly database data stored in a storage unit of a computer.

INTRODUCTION

Many systems and methods produce the collection and storage of large amounts of data. With modern relational databases, the preservation of large quantities of data within a storage unit, such as on magnetic or optical storage media, is not a problem. However, accessing this data can be very time consuming. For example, reading six million records from a structured query language (SQL) database on a storage unit can take as long as thirty seconds. Thirty seconds might not seem too long, but if there were 600 million records it would take fifty minutes to read all the data, which in many applications is too long.

When only a relatively small number of records are needed, this length of time is acceptable, and a standard SQL management system can be used to interrogate the database. However, when analyses are to be performed on large blocks of data, or when different configurations of the data are required, the standard interrogation of a database is much too slow, and the issues described above become more pronounced.

As a specific example, it is common to gather vibration information on rotating equipment so that problems that are manifested with vibration signatures can be quickly detected and resolved. Capturing a live stream of such information produces large amounts of data for even a single asset. However, for companies that have many such assets, the amount of information that is produced is extremely large. That large amount of information is then further compounded by keeping and adding to the data over long periods of time.

Because these databases of information are so large and take so long to interrogate, many who would otherwise desire to do so are dissuaded from accessing them unless the need is dire or the amount of data to be read is relatively small, and so they do not interrogate them for all the analyses that might be of use to them.

What is needed, therefore, are computer systems improvements that tend to reduce issues such as those described above, at least in part.

SUMMARY

The above and other needs are met by a method for transferring data from an SQL database in a storage unit to a memory by copying the data from the SQL database to a binary file in the storage unit, where the binary file having a data structure and a data type. A data file having the data structure and the data type is configured within the memory, and the binary file in the storage unit is copied to the data file in the memory with a single read/write operation.

In some embodiments according to this aspect of the invention, the data structure includes records and fields, with a number of records and a number of fields for each record. In some embodiments, the data type comprises at least one of real, integer, and word length.

When the records of the data file are sorted, some embodiments also include reading through the entire data file only once to find record positions for data containing predetermined data characteristics. A pointer table is created in the memory, where the pointer table includes a single record position for a first instance of each of the predetermined data characteristics within the data file. The data file is read starting at the record position in the pointer table that corresponds to a desired one of the predetermined data characteristics.

When the records of the data file are unsorted, some embodiments also include reading through the entire data file only once to find record positions for data containing predetermined data characteristics. A first pointer table is created in the memory, where the first pointer table includes a single record position for a first instance of each of the predetermined data characteristics within the data file. A second pointer table is created in the memory, where the second pointer table includes, in association with the record position for the first instance of each of the predetermined data characteristics, a subsequent record position for a next subsequent instance of each of the predetermined data characteristics within the data file. The data file is read starting at the record position in the first pointer table that corresponds to a desired one of the predetermined data characteristics, and if the data in the record position does not contain the desired data, the data file is iteratively read at the record position associated with the next subsequent instance in the second pointer table, until the desired data is found.

Some embodiments for correlating variables in the data file include the steps of reading the data file a first time to determine averages $\bar{x}$ and $\bar{y}$ for each x and y variable pair to be correlated. The data file is read a second time to determine, for each $x_i$ and $y_i$ variable, the following three values, where i represents the number of variables, $$\Sigma_i(x_i-\bar{x})(y_i-\bar{y}),$$

$$\sqrt{\Sigma_i(x_i-\bar{x})^2}, \text{ and}$$

$$\sqrt{\Sigma_i(y_i-\bar{y})^2}.$$

Each of the three values is stored in a cell of an array designated for the $x_i$ and $y_i$ variable pair. Using the three values in the array for each combination of $x_i$ and $y_i$ variables, the correlation value r is computed according to the formula $$r = \frac{\sum_i (x_i - \bar{x})(y_i - \bar{y})}{\sqrt{\sum_i (y_i - \bar{y})^2} \sqrt{\sum_i (y_i - \bar{y})^2}}.$$

According to another aspect of the invention there is described a method for reading a data file of records in a memory by reading through the entire data file only once to find record positions for data containing predetermined data characteristics. A pointer table is created in the memory, the pointer table including a single record position for a first instance of each of the predetermined data characteristics within the data file. The data file is read starting at the record position in the pointer table that corresponds to a desired one of the predetermined data characteristics.

In some embodiments, each record in the data file includes a plurality of fields, and all the fields are sorted according to a predetermined order. In some embodiments, each record of the data file includes a plurality of fields, all the fields are sorted according to a predetermined order, and the pointer table includes, for each of the fields, a single record position associated with a first instance for each of the predetermined data characteristics for each field.

According to another aspect of the present invention there is described a method for reading a data file of unsorted records to locate desired data by reading through the entire data file only once to find record positions for data containing predetermined data characteristics. A first pointer table is created in the memory, where the first pointer table includes a single record position for a first instance of each of the predetermined data characteristics within the data file. A second pointer table is created in the memory, where the second pointer table includes, in association with the record position for the first instance of each of the predetermined data characteristics, a subsequent record position for a next subsequent instance of each of the predetermined data characteristics within the data file. The data file is read starting at the record position in the first pointer table that corresponds to a desired one of the predetermined data characteristics, and if the data in the record position does not contain the desired data, iteratively reading the data file at the record position associated with the next subsequent instance in the second pointer table, until the desired data is found.

In some embodiments according to this aspect of the present invention, a first pointer table and a second pointer table are created for each field within the data file.

According to yet another aspect of the present invention there is described a method for correlating variables in a data file by reading the data file a first time to determine averages $\bar{x}$ and $\bar{y}$ for each x and y variable pair to be correlated. The data file is read a second time to determine, for each $x_i$ and $y_i$ variable the following three values, where i represents the number of variables, $\Sigma_i(x_i-\bar{x})(y_i-\bar{y})$, $\sqrt{\Sigma_i(x_i-\bar{x})^2}$, and $\sqrt{\Sigma_i(y_i-\bar{y})^2}$.

Each of the three values is stored in a cell of an array designated for the $x_i$ and $y_i$ variable pair. Using the three values in the array for each combination of $x_i$ and $y_i$ variables, the correlation value r is computed according to the formula, $$r = \frac{\sum_i (x_i - \bar{x})(y_i - \bar{y})}{\sqrt{\Sigma_i (y_i - \bar{y})^2} \sqrt{\Sigma_i (y_i - \bar{y})^2}}.$$

In some embodiments, the correlation value r is only calculated for unique combinations of the $x_i$ and $y_i$ variables.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Apparatus

Figure 1:
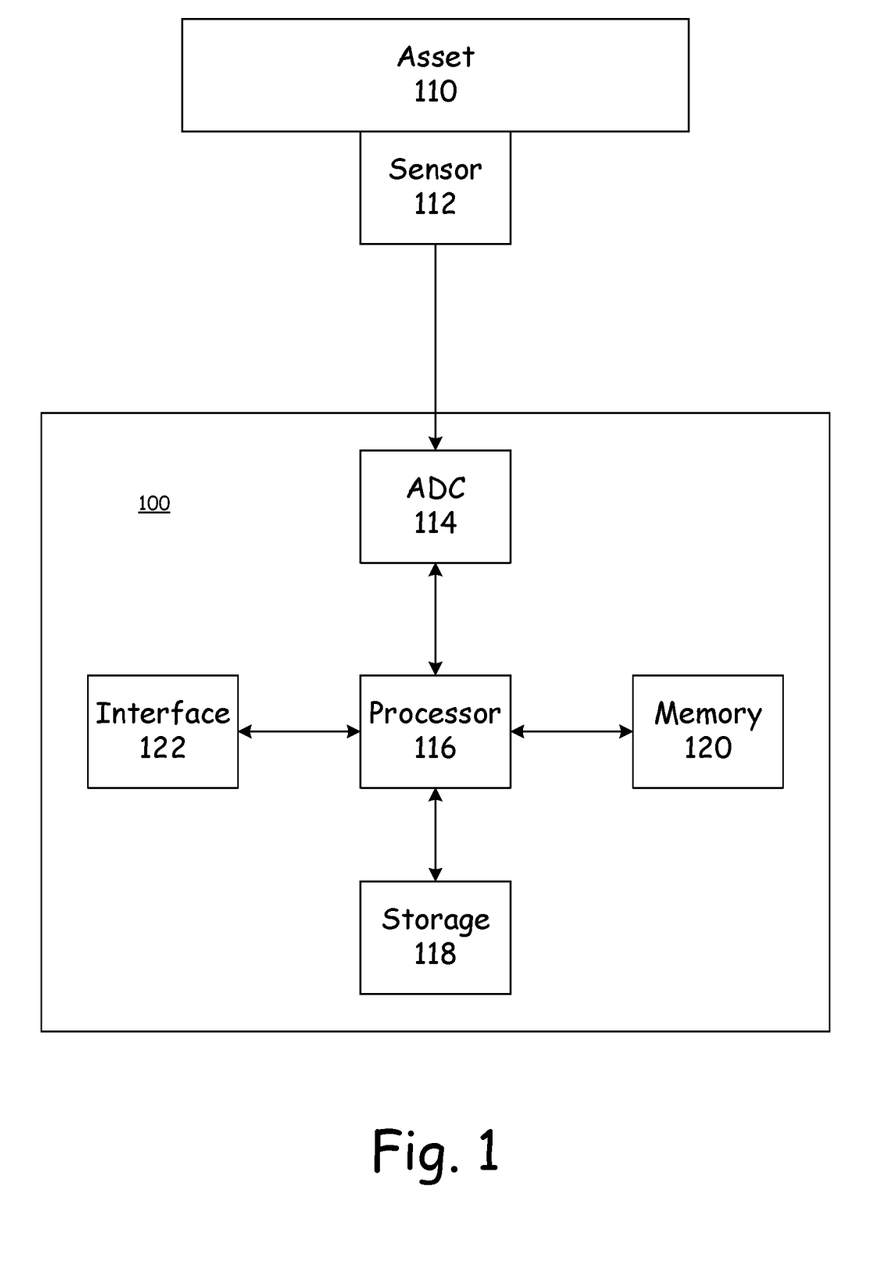
FIG. 1 is a schematic representation of a computer system for collecting and analyzing vibrational data from a machine.

FIG. 1 illustrates, schematically, a computer system 100 according to an embodiment of the present invention. In some embodiments, the computer system 100 is one of an imbedded computing device such as a Raspberry Pi, a handheld computer such as a phone or PDA, a portable computer such as a tablet or laptop, a desktop computer such as a PC, and a main frame computer. In the embodiment depicted, the computer system 100 receives data from a sensor 112, such as might be reading vibration data from an asset 110, such as a machine with a rotating element. In one embodiment, the computer system 100 and sensor 112 constitute a handheld vibration analyzer. In other embodiments, the computer system 100 and sensor 112 constitute a remote vibration analyzer that is mounted on the asset 110. Other embodiments are also comprehended.

In some embodiments, the computer system 100 includes an analog to digital converter (ADC) 114 for receiving analog sensor data and converting it to digital data, a processor 116 for performing operations on the data and for controlling the other elements of the computer system 100, a storage device 118 for storing data (such as on magnetic or optical media), a memory 120 for storing instructions for the operation of the computer system 100, and for the temporary storage of data when there are operations to be performed on the data by the processor 116 (such as DRAM), and an interface 112 for presenting visual or audible information or communicating with other systems.

As used herein, the term database refers to a data structure that is stored on the data storage unit 118, and is in a format that is configured for reading and writing by the database management program, such as an SQL database program. The term binary file refers to a data file that is stored on the data storage unit 118 and is in a flat file configuration of records and fields. The term data file refers to data that is stored on the memory 120, and is in a flat file configuration of records and fields.

To overcome the lengthy read times for databases disposed on the storage unit 118, as described above, all or a portion of the data can be written into and optionally maintained as a structured binary file in the storage 118 for rapid transfer into the memory 120. In one embodiment, the time required to copy the structured binary file from the storage 118 to the memory 120 was 2,000 time faster than using an SQL management program to read an SQL database on the storage unit 118 into the memory 120. For example, if reading the SQL database takes thirty seconds to copy the data, copying the data from the binary file of the same data on the storage unit 118 only takes fifteen milliseconds to read. This is accomplished with a single block read/write operation from the binary file to the data file. Thus, if there were 100 times more data than this, the binary file approach would only take 1.5 seconds, which would be far more practical than the fifty minutes needed to read the SQL database.

As a part of this process, the data file in the memory 120 and the binary file in the storage unit 118 are both configured according to the properties of the data that is extracted from the SQL database. It is appreciated that in some embodiments all the data in the SQL database is to be extracted, and in other embodiments only a portion of the data in the SQL database is to be extracted. However, as the amount of data to be extracted increases, the benefits of the embodiments of the present invention are more fully realized.

Data Transfer

Figure 2:
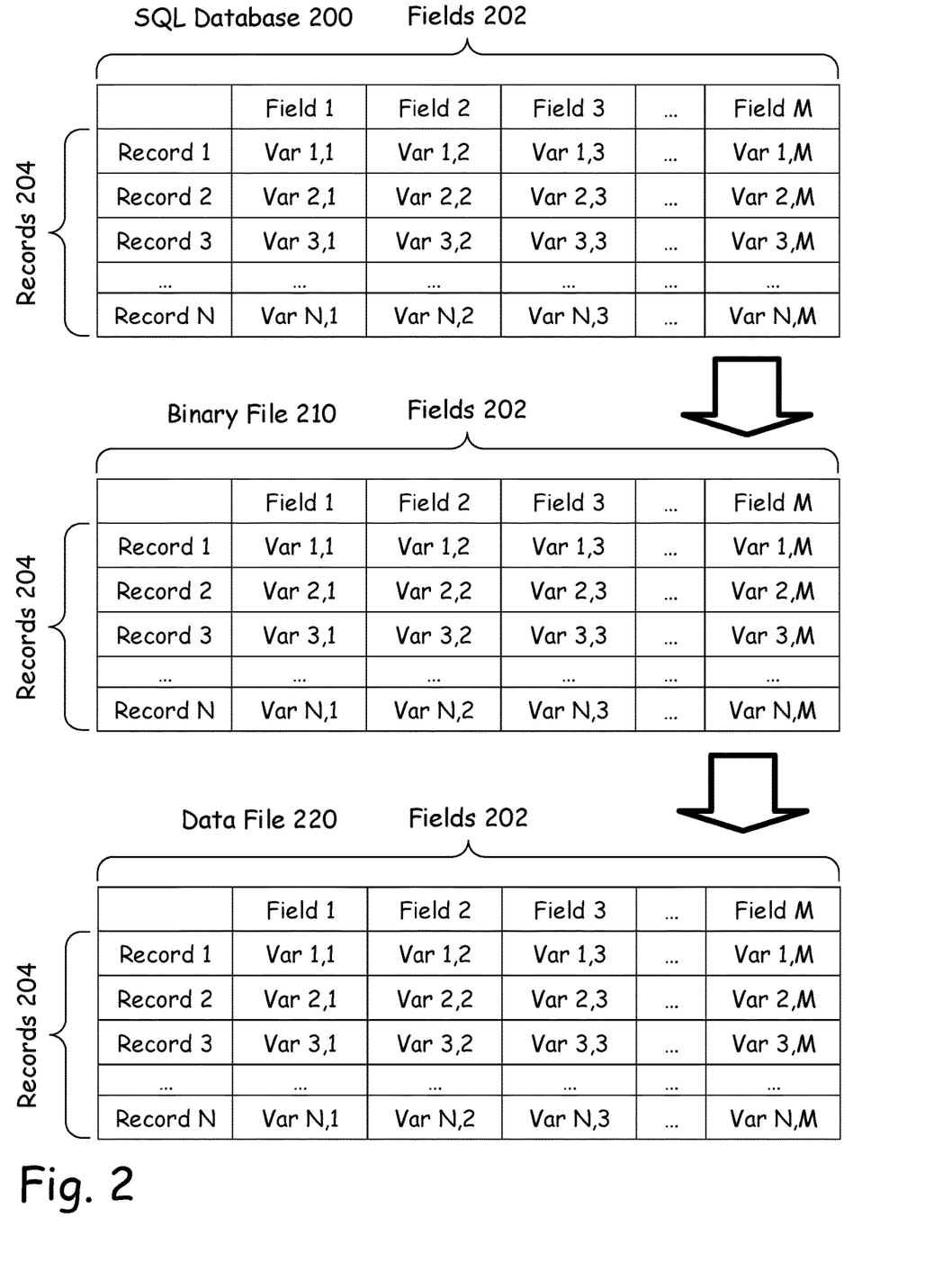
FIG. 2 is a graphical illustration of a method for transferring data from a database in a storage unit to a data file in a computer memory in a single read/write step.

FIG. 2 graphically illustrates a method for copying the data in the SQL database 200 on the storage unit 118 to the binary file 210 on the storage unit 118 and then into the data file 220 in the memory 120. In this example, the database 200 on the storage unit 118 is comprised of a number N of records 204 that include a number M of fields 202, in which different variables are recorded. It is appreciated that the SQL database 200 can include any number of records 204 and fields 202, and that the numbers M and N depicted in FIG. 2 are representative only. The data as depicted in the SQL database 200 of FIG. 2 is formatted as a flat file. However, this depiction is used for clarity in the description, and such flat file formatting would typically not be used in an SQL database 200, but rather a relational formatting would typically be used.

In addition to the actual data that is contained in the SQL database 200, there is also metadata. That metadata includes, for example, the number N of records 204, the number M of fields 202 in each record 204, the type of data in each field 202, and the length of each field 202. The type of data includes designations such as integer, small integer, real, and so forth. The length of each field 202 is, in most embodiments, measured in bytes of data. As used herein, data structure refers to such metadata as the number N of records 204 and the number M of fields 202 in each record 204. As used herein, data type refers to such metadata as the type of data in each field 202, and the length of each field 202.

The metadata from the SQL database 200 is used to construct both the binary file 210 on the storage unit 118 and the data file 220 in the memory 120. This involves a configuration processes such as mapping out a block in the memory 120 of the appropriate size, so that when data is eventually read into the data file 220, it can all be done in one continuous read/write operation. In some embodiments the structure of the binary file 210 is constructed first, and in other embodiments the structure of the data file 220 is constructed first.

The data is then read out from the SQL database 200 and into the binary file 210. During this process, the structure of data as contained in the SQL database 200 is modified to the flat file structure of the binary file 210. This might take some length of time, but it only need be done once, and then the binary file 210 can be retained and even updated on the storage unit 118, as desired. As new data is entered into the SQL database 200, it can also be added to the binary file 210.

When the data from the SQL database 200 needs to be loaded into the memory 120 for analysis, such as might be determined by some sort of event driven trigger, the numbers N and M of records 204 and fields 202 are determined and an array of the required size is created in the memory 120 as the starting point for the data file 220. Using a single read/write operation, the data in the binary file 210 is read directly into the array of the data file 220 in the memory 120. As the structure of the data in the binary file 210 and the data file 220 are the same, no additional data conversion is required. This makes for a very efficient transfer of the data in the binary file 210 into the data file 220 and saves a considerable amount of time in acquiring the data.

Figure 3:
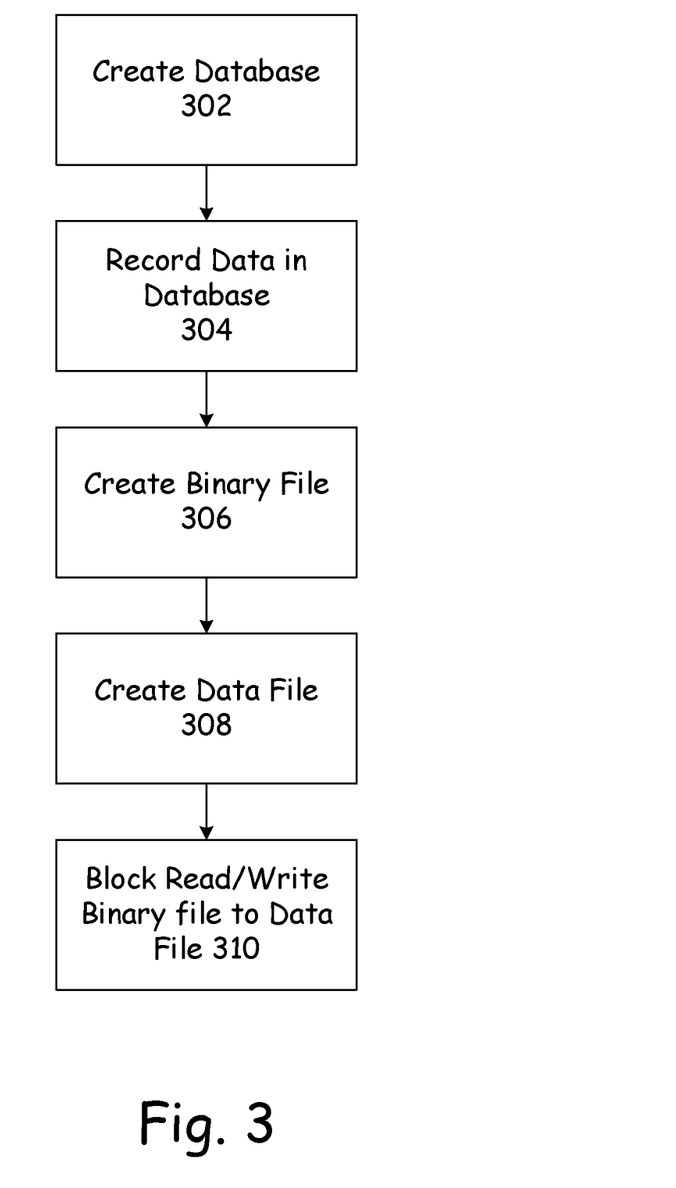
FIG. 3 is a flow chart for the method illustrated in FIG. 2.

The overall system flow 300 is shown in FIG. 3. As given in block 302, the database 200 is first created on the storage unit 118, and data is recorded in the database 200 as given in block 304. In various embodiments, the data is vibrational data that is received from one or more of different sources, such as a portable vibration analyzer and an online vibration analyzer. The binary file 210 is created in the storage unit 118, as given in block 306. At a desired point in time, the data file 220 is created in the memory 120, and is created to have the same characteristics as the binary file 210, such as by using the metadata. Finally, the data from the binary file 210 is copied into the data file 220 in the memory 120 with a single continuous read/write operation, as given in block 310. The number N of records and number M of fields in the binary file 210 may also recorded as an entry in the binary file 210 and the data file 220.

In this manner there is provided a method for performing a much quicker read of data from the storage unit 118 to the memory 120.

Data Access I

Some data sets can be sorted in one manner or another according to one or more fields, and this makes them more easily analyzed than does the order in which the data was originally generated. This first data access method is in regard to such data sets.

According to this method, the data file 220 in the memory 120 is sorted according to some desired criteria, such as numerically ascending values of the variable in the first field 202. For example, if the variables in the first field of the data file 220 were four-digit integers, the sorting operation described above would result in all of the variables that started with the number 1 being first in the data file 220, then all of the variables that started with 2 being next, and so forth. Likewise, there would be some number of variables starting with 1, another number of variables starting with 2, and so on.

If it were desired to perform an analysis on those records 204 having variables in the first field 202 that started with the number 8, for example, a prior art system would have to read down through the records 204 in the data file 220 until the 8's were encountered in the first field 202. If there were millions of records 204 in the data file 220, this might waste a tremendous amount of time, in relative terms, especially if this operation needed to be performed multiple times.

Figure 4:
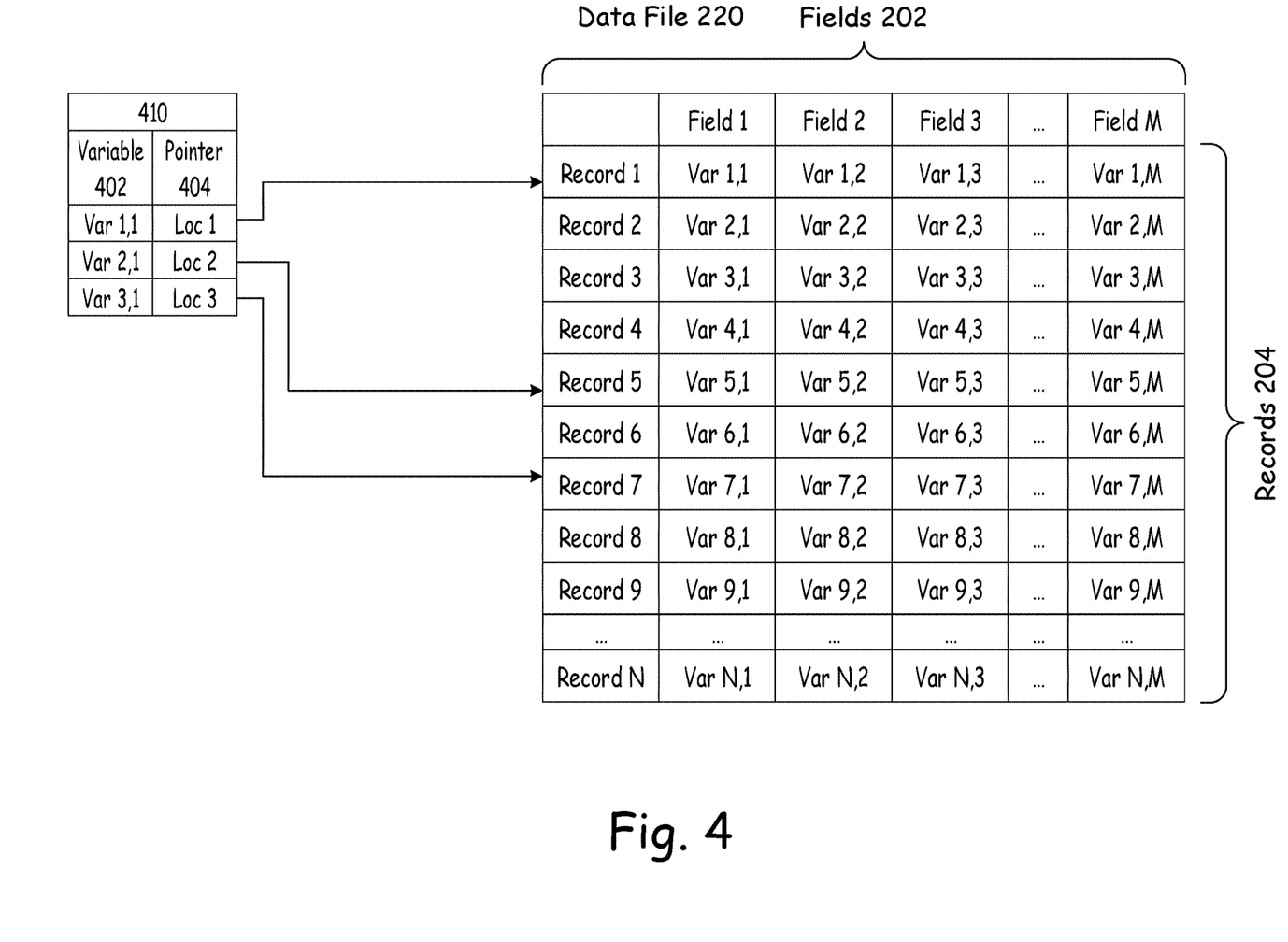
FIG. 4 is a graphical illustration of a method for selecting data for analysis according to a second embodiment of the disclosure.

Therefore, according to an embodiment according to the present invention, the data file 220 is read through one time, and an indexing pointer table 410 is created, as depicted in FIG. 4. The pointer table 410 contains, for example, a minimum of two fields for each record in the pointer table 410. In the first field 402 are the various indexed values of the variables of the first field 202 of the data file 220, to continue the example from above. Thus, this portion 402 of the pointer table 410 would contain one of the numbers 0-9 in each of the records. In a field 404 of the pointer table 410 are descriptions of the position of the first instance in the data file 220 of the desired value. This position descriptor can be something such as the number of a record 204 or an address in the memory 120 at which the first instance of the desired data is stored. The lines from table 410 to data file 220 are graphical indications of the location of the records that include the first instance of the desired variable.

Again continuing the example from above, if variables starting with the number 8 are desired for analysis, the pointer table 410 is interrogated to find the number 8 in the first column, and then the memory location for the first instance of the desired variable is read from the pointer table 410, and then that information is used to start a read of the data file 220. In this manner, the time associated with reading through unwanted data is saved.

In a further embodiment, the pointer table 410 is also read to determine the memory location of the first instance of the next succeeding variable value, which to continue the example would be the number 9. With this memory location know, the read of the data file 220 can automatically be stopped when the last 8 variable has been read. In this manner, the knowledge of the exact size of the read prior to the start of the read can have some benefits, such as an elimination of the analysis of the data as it is read out to determine the stop of the read, and also such as mapping out in advance a portion of the memory 120 with a predetermined size in which to place the read variables, as desired.

Figure 5:
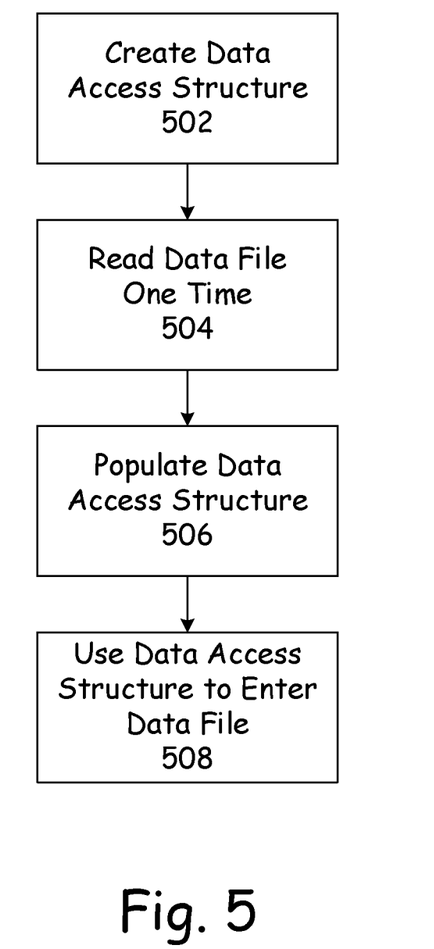
FIG. 5 is a flow chart for the method illustrated in FIG. 4.

FIG. 5 provides a simplified flow chart of this method. The first step is to create the data access structure 410, as given in block 502. As discussed above, this can be accomplished with a single read of the data file 220, as given in block 504. The data access structure 410 is then populated with the information gathered from the data file 220, as given in block 506. Thereafter, the data access structure 410 is used to enter the data file 220, as given in block 508, which removes the need to read down through the data file 220 starting at the top whenever new data is to be retrieved from the data file 220.

Data Access II

In some embodiments, however, the data might be received according to multiple contiguous sequences having structures that are not immediately reflected in the received data. For example, different variables 202 are received in records 204, but neither the variables 202 nor the records 204 reflect the sequence into which the data is organized, otherwise referred to herein as a data trend, and there might be value in analyzing different data trends separately, without disturbing the order in which the data is received.

In such an embodiment, a marker such as a trend identification can be added to the data to identify the data trends one from another. For example, all of the records 204 belonging to the first data trend could be identified with a 1, all the records 204 in the second data trend identified with a 2, and so forth, with the data trend identification stored, for example, in a new variable 202 field. Then the pointer table 410 is constructed with the data trend identifier in column 402, which is used to enter a desired data trend in the same manner as described above.

The pointers 404 in table 410 enable a computer to rapidly sequence through the data in the data file 220, and can also be used to provide an order in which the data is to be processed. Using this approach, trend data may be accessed in a very efficient and timely manner. Computer performance tests using six million records of vibrational trend data, according to the embodiment of FIGS. 4 and 5, produced a one order of magnitude increase in computer performance on a standalone computer system. A network with multiple users could be expected to provide an even greater performance improvement using these methods.

Data Access III

Figure 6:
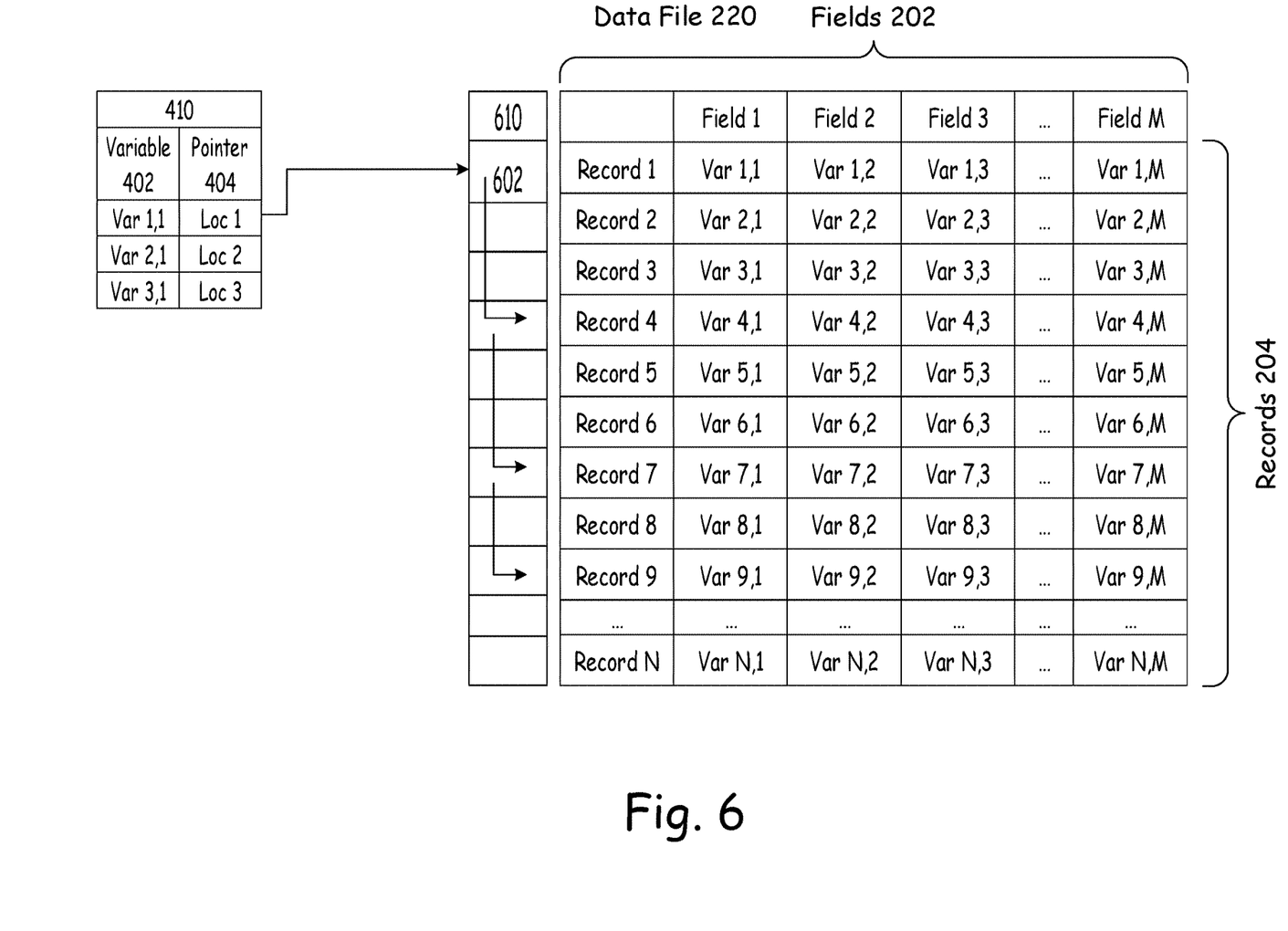
FIG. 6 is a graphical illustration of a method for selecting data for analysis according to a third embodiment of the disclosure.

In some applications, it may be necessary to analyze the data in the order in which it is received, and so the data cannot be sorted according to the embodiments of Data Access I. The goal is to find and access all instances of a particular variable value. One embodiment, as depicted in FIG. 6, is to leave the data file 220 in the order in which the data was originally created, such as a time series, read the data file 220 through once, and while so doing, create the pointer table 410 as given above that includes in field 404 the first instance for given variables 202 and the associated memory position in field 402 for each.

A second pointer table 610 is created in memory 120 to provide a subsequent record position or memory location that is associated with a subsequent instance of the desired variable 602. This is represented in FIG. 6 as pointer table 610, where arrows represent additional entry points into the data file 220 in which subsequent instances of the desired variable 602 are located. Thus, there would be a separate table 610 for each of the variables indexed in the data access structure 410. In this manner, data that is associated with the desired variable value can be relatively quickly located in an unsorted data file 220, without the need to read the data file 220 down from the top multiple times.

Figure 7:
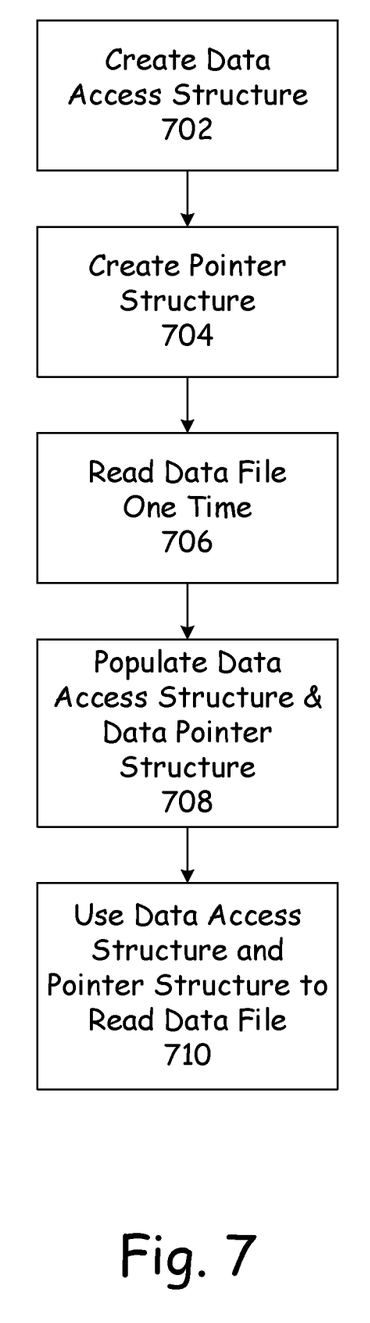
FIG. 7 is a flow chart for the method illustrated in FIG. 6.

FIG. 7 depicts a method for this embodiment, where a memory location for the data access structure 410 is created, as given in block 702. A memory location for the pointer table 610 is also created, as given in block 704. The data file 220 is read through a single time, as given in block 706, and the data access structure 410 and the data pointer table 610 are populated with the data as described above, as given in block 708. Thereafter, the data file 220 is interrogated using the data access structure 410 and the pointer table 610, as given in block 710.

Variable Correlation

Finding the correlation that might exist between one variable 202 in a given set of records 204 and another variable 202 in the given set of records 204 enables an analyst to discover additional insight into the behavior of the system that created the data. The variables 202 may include vibration data characteristics for a machine, machine characteristics, or a combination of machine and vibration characteristics for the machine.

Figure 8:
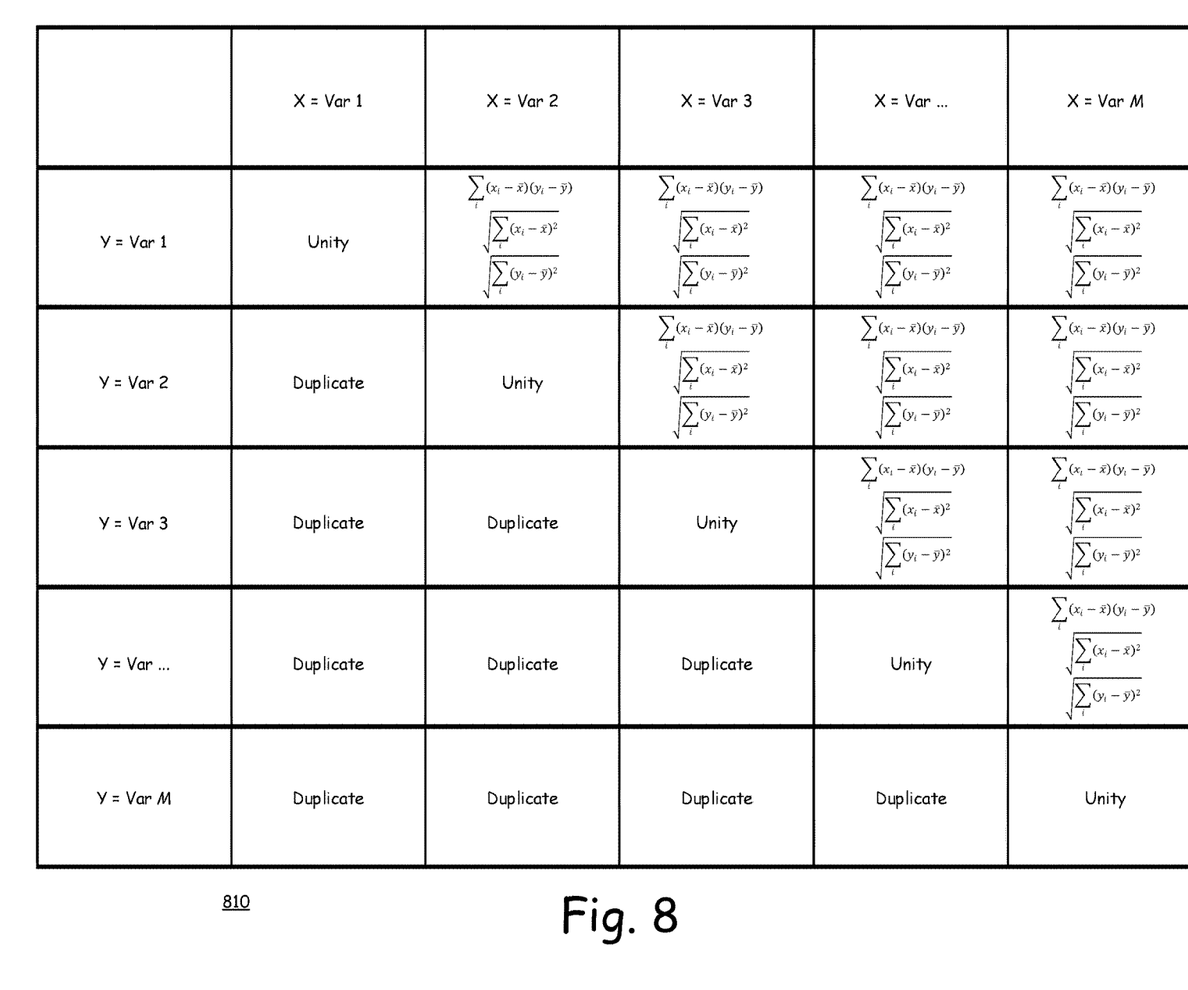
FIG. 8 is a two-dimensional array for calculating correlation coefficients for pairs of variables in a data file according to an embodiment of the disclosure.

With reference to FIG. 8, there is depicted a graphical depiction for how this is done. Such a task can be visualized by listing each of the variables 202 across the top of the matrix 810, and then also listing those same variables 202 down the left side of the matrix 810. The variables 202 across the columns are designated as $x_i$, where i varies from one to M (the total number of variables being analyzed), and the variables 202 down the rows are designated as $y_i$. The box at the intersection of a given row and column represents the correlation between the two variables 202 represented by the intersecting row and column.

Obviously, each of the variables 202 correlates perfectly with itself, and so the boxes on the chart that are at the intersection of a row and column that each represent the same variable 202 ($x_1$ and $y_1$, for example) are represented by unity, and so no computation for correlation for that intersection need be made. Further, all of those boxes on one side of the unity diagonal represent the exact same correlation as those boxes on the other side of the unity line (the correlation between $x_1$ and $y_2$ is the same as the correlation between $x_2$ and $y_1$), and thus are duplicates that need not be calculated. Therefore, if there are M variables 202 to be correlated, one need only do the computations for $$\left(\left(\frac{M^2}{2}\right) - M\right)$$

unique variable 202 pairs.

The correlation r between each unique combination of two variables 202 x and y is determined by solving the following equation:

$$r = \frac{\sum_i (x_i - \bar{x})(y_i - \bar{y})}{\sqrt{\sum_i (y_i - \bar{y})^2} \sqrt{\sum_i (y_i - \bar{y})^2}}.$$

However, this equation has traditionally required several passes through every record of the database in order to compute the value for one given correlation pair. Thus, computing the correlation coefficients for a large number of records 204, where each record 204 has a large number of variables 202, can be very time consuming. For example, calculating the correlations for six million records 204 with 274 variables 202 each took 1.5 hours, which is far too long for many applications.

According to one embodiment, all correlation coefficients between two unique pairs of variables 202 can be determined by using only two passes through the database. In the first pass through the database, average values $\bar{x}$ and $\bar{y}$ for each x and y variable 202 pair to be correlated are determined. The database is then read a second time to determine for each $x_i$ and $y_i$ variable the following three values:

$$\Sigma_i(x_i-\bar{x})(y_i-\bar{y}),$$

$$\sqrt{\Sigma_i(x_i-\bar{x})^2},$$

$$\sqrt{\Sigma_i(y_i-\bar{y})^2}.$$

Each of the three values for the above formulas is independently stored in the memory 120 in an array designated for each $x_i$ and $y_i$ variable pair as shown in FIG. 8. After these three portions of the overall correlation equation have been computed individually and stored in the memory 120 in association with a given $x_i$ and $y_i$ variable 202 pair, the three portions are combined for each combination of $x_i$ and $y_i$ variables 202 to produce the correlation value r according to the standard formula given below, with no further passes down through the records of the data:

$$r = \frac{\sum_i (x_i - \bar{x})(y_i - \bar{y})}{\sqrt{\sum_i (y_i - \bar{y})^2} \sqrt{\sum_i (y_i - \bar{y})^2}}.$$

In a test case of 274 variables 202 (fields) and six million data points (records 204), calculations according to the prior art (FIG. 7) required reading down through all the data 274×274 times. However, using the procedure described above, the data was read down through only twice. The first approach took 1.5 hours to calculate all the correlation coefficients, while the second approach only took eighteen seconds, which is an increase of over 2,000 times in computer performance. It will be appreciated that the foregoing procedure may be adapted for evaluating correlation coefficients for more than two variables 202 (higher order interactions), with even greater savings in computational efficiency.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for improving the operation of a computer by transferring data from an SQL database in a storage unit to a memory, the method comprising the steps of:
    copying the data from the SQL database to a binary file in the storage unit, the binary file having a data structure and a data type,
    configuring within the memory a data file having the data structure and the data type, and
    copying the binary file in the storage unit to the data file in the memory with a single read/write operation,
    wherein reading the data file to locate desired data, when records of the data file are unsorted, comprising:
        reading through the entire data file only once to find record positions for data containing predetermined data characteristics,
        creating a first pointer table in the memory, the first pointer table including a single record position for a first instance of each of the predetermined data characteristics within the data file,
        creating a second pointer table in the memory, the second pointer table including, in association with the record position for the first instance of each of the predetermined data characteristics, a subsequent record position for a next subsequent instance of each of the predetermined data characteristics within the data file, and
        reading the data file starting at the record position in the first pointer table that corresponds to a desired one of the predetermined data characteristics, and if the data in the record position does not contain the desired data, iteratively reading the data file at the record position associated with the next subsequent instance in the second pointer table, until the desired data is found.

2. The method of claim 1, wherein the data structure comprises records and fields, with a number of records and a number of fields for each record.

3. The method of claim 1, wherein the data type comprises at least one of real, integer, and word length.

4. A method for reading the data file produced by the method of claim 1, when the records of the data file are sorted, comprising:
    reading through the entire data file only once to find record positions for data containing predetermined data characteristics,
    creating a pointer table in the memory, the pointer table including a single record position for a first instance of each of the predetermined data characteristics within the data file, and
    reading the data file starting at the record position in the pointer table that corresponds to a desired one of the predetermined data characteristics.

5. A method for correlating variables in the data file produced by the method of claim 1, the method comprising the steps of:

reading the data file a first time to determine averages $\bar{x}$ and $\bar{y}$ for each x and y variable pair to be correlated,
reading the data file a second time to determine for each $x_i$ and $y_i$ variable the following three values, where i represents the number of variables, $\Sigma_i(x_i-\bar{x})(y_i-\bar{y})$, $\sqrt{\Sigma_i(x_i-\bar{x})^2}$, $\sqrt{\Sigma_i(y_i-\bar{y})^2}$, storing each of the three values in a cell of an array designated for the $x_i$ and $y_i$ variable pair, and
using the three values in the array for each combination of $x_i$ and $y_i$ variables, computing the correlation value r according to the formula $$r = \frac{\sum_i (x_i - \bar{x})(y_i - \bar{y})}{\sqrt{\Sigma_i (y_i - \bar{y})^2} \sqrt{\Sigma_i (y_i - \bar{y})^2}}.$$

\* \* \* \* \*